(12) United States Patent
Browe et al.

(10) Patent No.: US 8,919,650 B2
(45) Date of Patent: Dec. 30, 2014

(54) OPTICAL DEVICE

(75) Inventors: Brian K. Browe, Harrison Township, MI (US); Brian S. Schaupeter, St. Clair Shores, MI (US); Jon Graban, Saline, MI (US)

(73) Assignee: Browe, Inc, Madison Heights, MI (US)

( * ) Notice: Subject to any disclaimer, the term of this patent is extended or adjusted under 35 U.S.C. 154(b) by 669 days.

(21) Appl. No.: 13/102,616

(22) Filed: May 6, 2011

(65) Prior Publication Data

US 2012/0013258 A1  Jan. 19, 2012

Related U.S. Application Data

(60) Provisional application No. 61/343,970, filed on May 6, 2010.

(51) Int. Cl.
*H05B 37/02* (2006.01)
*G02B 23/10* (2006.01)
*F41G 1/34* (2006.01)
*G02B 27/34* (2006.01)

(52) U.S. Cl.
CPC .............. *G02B 23/105* (2013.01); *F41G 1/345* (2013.01); *G02B 27/34* (2013.01)
USPC ............ 235/454; 359/158; 359/248; 359/399

(58) Field of Classification Search
USPC ............................. 235/454; 359/158, 248, 399
See application file for complete search history.

(56) References Cited

U.S. PATENT DOCUMENTS

| | | |
|---|---|---|
| 2,952,158 A | 2/1955 | Friedman et al. |
| 3,833,799 A | 9/1974 | Audet |
| 3,963,356 A | 6/1976 | Wiklund |
| 4,531,052 A | 7/1985 | Moore |
| 4,658,139 A | 4/1987 | Brennan et al. |
| 4,665,622 A | 5/1987 | Idan |
| 4,806,007 A | 2/1989 | Bindon |
| 5,483,362 A * | 1/1996 | Tai et al. ........................ 359/1 |
| 5,493,450 A | 2/1996 | Ekstrand |

(Continued)

FOREIGN PATENT DOCUMENTS

| | | |
|---|---|---|
| DE | 202006000976 U1 | 5/2006 |
| EP | 0721561 B1 | 7/1996 |

(Continued)

OTHER PUBLICATIONS

English language abstract for DE 202006000976 (U1) extracted from espacenet.com database May 6, 2011, 10 pages.

(Continued)

*Primary Examiner* — Allyson Trail
(74) *Attorney, Agent, or Firm* — Howard & Howard Attorneys PLLC (57) ABSTRACT

An optical device has a tube including a tube wall defining a viewing bore. A light source is in communication with the viewing bore for illuminating an aim point visible in the viewing bore. A control system includes a circuit board supported by the tube exterior of the viewing bore. The control system is in communication with the light source for controlling brightness of the illuminated aim point. The control system includes a light sensor mounted to the circuit board and extending from the circuit board through the tube wall into the viewing bore for sensing light in the viewing bore.

21 Claims, 9 Drawing Sheets

(56) References Cited

U.S. PATENT DOCUMENTS

| | | | |
|---|---|---|---|
| 5,653,034 | A | 8/1997 | Bindon |
| 5,924,234 | A | 7/1999 | Bindon et al. |
| 5,937,557 | A | 8/1999 | Bowker et al. |
| 5,943,174 | A | 8/1999 | Bryant et al. |
| 5,946,132 | A | 8/1999 | Phillips |
| 6,363,648 | B1 | 4/2002 | Kranich et al. |
| 6,373,628 | B1 | 4/2002 | Gunnarsson et al. |
| D472,256 | S | 3/2003 | Schick |
| D472,569 | S | 4/2003 | Schick |
| 6,807,742 | B2 | 10/2004 | Schick et al. |
| 6,862,832 | B2 | 3/2005 | Barrett |
| 7,290,345 | B2 | 11/2007 | Ellig |
| 7,676,137 | B2 | 3/2010 | Schick et al. |
| 2002/0078618 | A1* | 6/2002 | Gaber ............... 42/123 |
| 2003/0012015 | A1 | 1/2003 | Schiller et al. |
| 2005/0268521 | A1 | 12/2005 | Cox et al. |
| 2007/0109638 | A1* | 5/2007 | Tai ............... 359/399 |
| 2008/0098640 | A1 | 5/2008 | Sammut et al. |
| 2009/0160834 | A1 | 6/2009 | Tseng et al. |
| 2009/0167201 | A1* | 7/2009 | Duelli et al. ............... 315/248 |
| 2010/0095578 | A1 | 4/2010 | Elpedes et al. |
| 2010/0103508 | A1 | 4/2010 | Pochapsky |
| 2010/0157292 | A1 | 6/2010 | Tsai et al. |
| 2010/0170136 | A1 | 7/2010 | Buckingham et al. |
| 2011/0037967 | A1 | 2/2011 | Liang |

FOREIGN PATENT DOCUMENTS

| | | |
|---|---|---|
| EP | 0918243 A2 | 5/1999 |
| EP | 1155276 B1 | 11/2001 |
| EP | 1210561 B1 | 6/2002 |
| EP | 1772695 B1 | 4/2007 |
| WO | WO 9526674 A1 | 10/1995 |
| WO | 2008049130 A2 | 4/2008 |

OTHER PUBLICATIONS

English language abstract for EP 1772695 (A1) extracted from espacenet.com database May 6, 2011, 28 pages.

International Search Report for Application No. PCT/US2011/035561 dated Aug. 26, 2011, 2 pages.

\* cited by examiner

OPTICAL DEVICE

CROSS-REFERENCE TO RELATED APPLICATIONS

The subject patent application claims priority to and all the benefits of U.S. Provisional Patent Application No. 61/343,970, which was filed on May 6, 2010, the entire specification of which is expressly incorporated herein by reference.

BACKGROUND OF THE INVENTION

1. Field of the Invention

The present invention relates to an optical device and, more specifically, an optical device that includes an illuminated aim point.

2. Description of the Related Art

Optical devices are used for magnifying a distant target area and can be mounted on a firearm. The optical device includes a tube having an objective end, an ocular end, and a viewing bore extending from the objective end to the ocular end. Typically, an objective lens is mounted in the bore at the objective end, an ocular lens is mounted in the bore at the ocular end, and an optic is mounted in the viewing bore between the objective lens and the ocular lens.

An aim point is visible in the viewing bore when viewed from the ocular end. The aim point is typically defined on the optic, typically by etched lines or embedded fibers. Depending upon light conditions, the aim point can be difficult to view and can be difficult to properly aim relative to the target area.

The aim point can be illuminated to enhance aiming of the firearm with the optical device. However, a major disadvantage to an illuminated aim point is the lack of adequate control over the brightness of the aim point. If the illuminated aim point is too dim compared to the target area, then the illuminated aim point is difficult to view. On the other hand, if the illuminated aim point is too bright then the illuminated aim point interferes with the view of the target area. In addition, systems that illuminate the aim point are also expensive and disadvantageously add size and weight to the optical device while disadvantageously causing an imbalance in the weight distribution of the optical device.

SUMMARY OF THE INVENTION AND ADVANTAGES

An optical device comprises a tube including a tube wall defining a viewing bore. A light source is in communication with the viewing bore for illuminating an aim point visible in the viewing bore. A control system includes a circuit board supported by the tube exterior of the viewing bore. The control system is in communication with the light source for controlling brightness of the illuminated aim point. The control system includes a light sensor mounted to the circuit board and extending from the circuit board through the tube wall into the viewing bore for sensing light in the viewing bore.

Since the light sensor is mounted to the circuit board and extends from the circuit board through the tube wall into the viewing bore, the design and components of the control system are advantageously simplified. The simplified design and components advantageously reduce the cost to produce the optical device. Further, the compact design advantageously minimizes the overall size and weight of the control system. In addition, since the overall size and weight of the control system is minimized, the compact size and weight of the control system is easily balanced so that the optical device has a balanced weight distribution.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
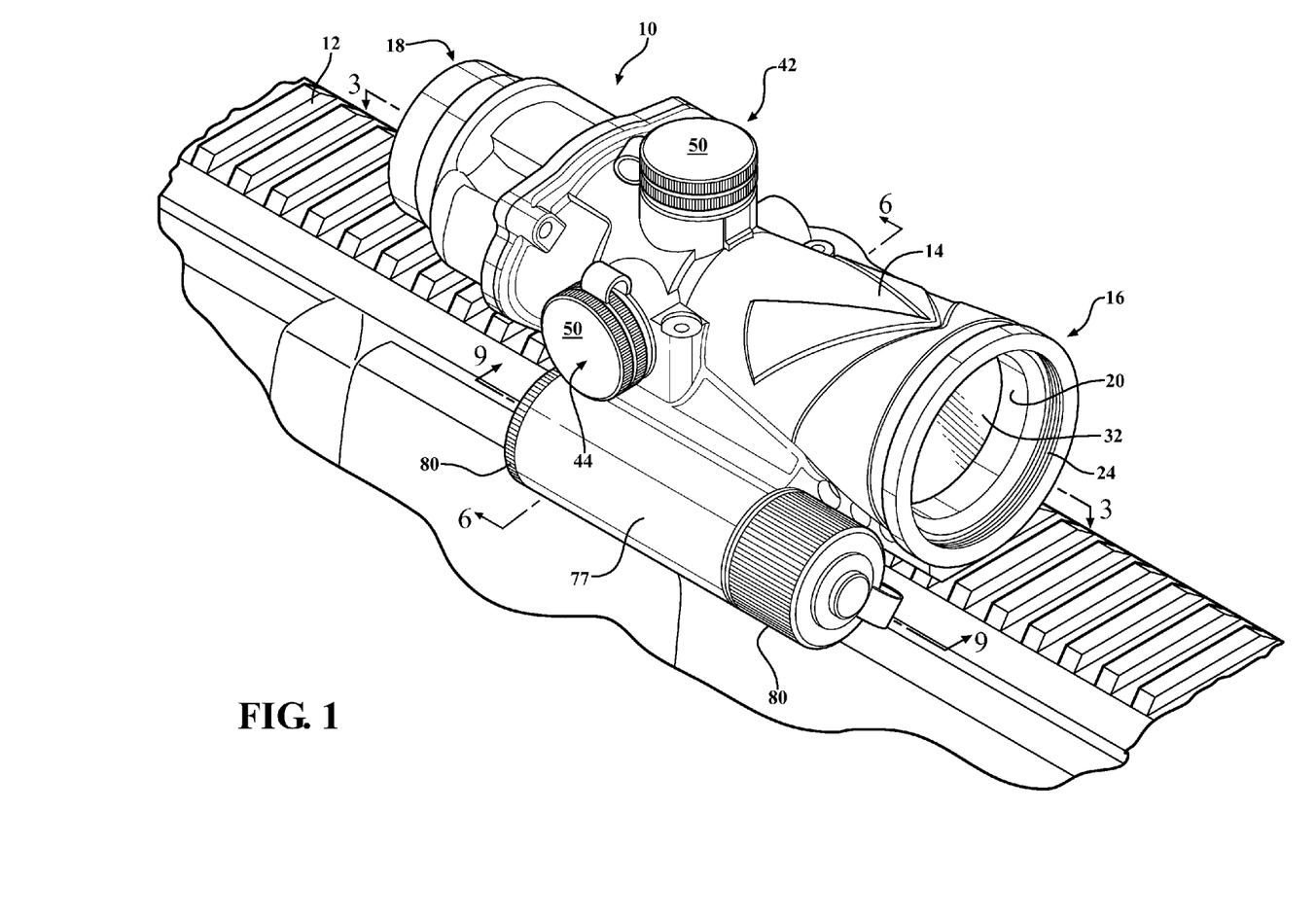
FIG. 1 is a perspective view of an optical device mounted on a firearm.

Referring to the Figures, wherein like numerals indicate like parts throughout the several views, an optical device 10 is generally shown for magnifying a distant target area (not shown). With reference to FIG. 1, the optical device 10 can be mounted on a firearm 12 such as, for example, a military or police assault rifle such as an M4 or M16/AR15. However, the optical device 10 can be mounted on any type of firearm including military, police, or civilian, without departing from the nature of the present invention. Alternatively, the optical device 10 can be used independently from a firearm and can be, for example, binoculars, a spotting scope, etc. The optical device 10, for example, is a 4×32 magnified optic. In any event, the optical device 10 is typically waterproof, for example, up to 100 ft.

Figure 2:
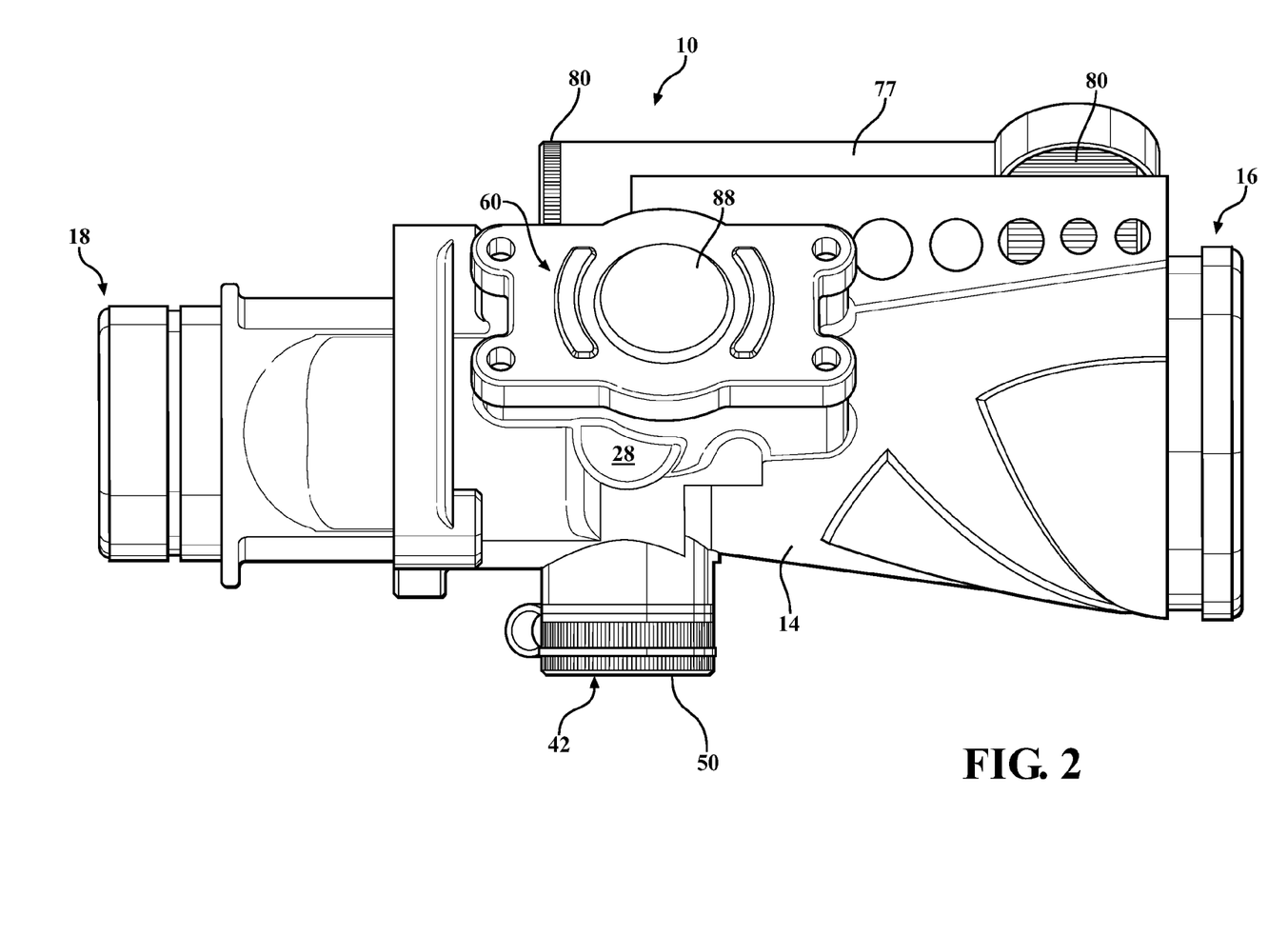
FIG. 2 is a side view of the optical device.
Figure 3:
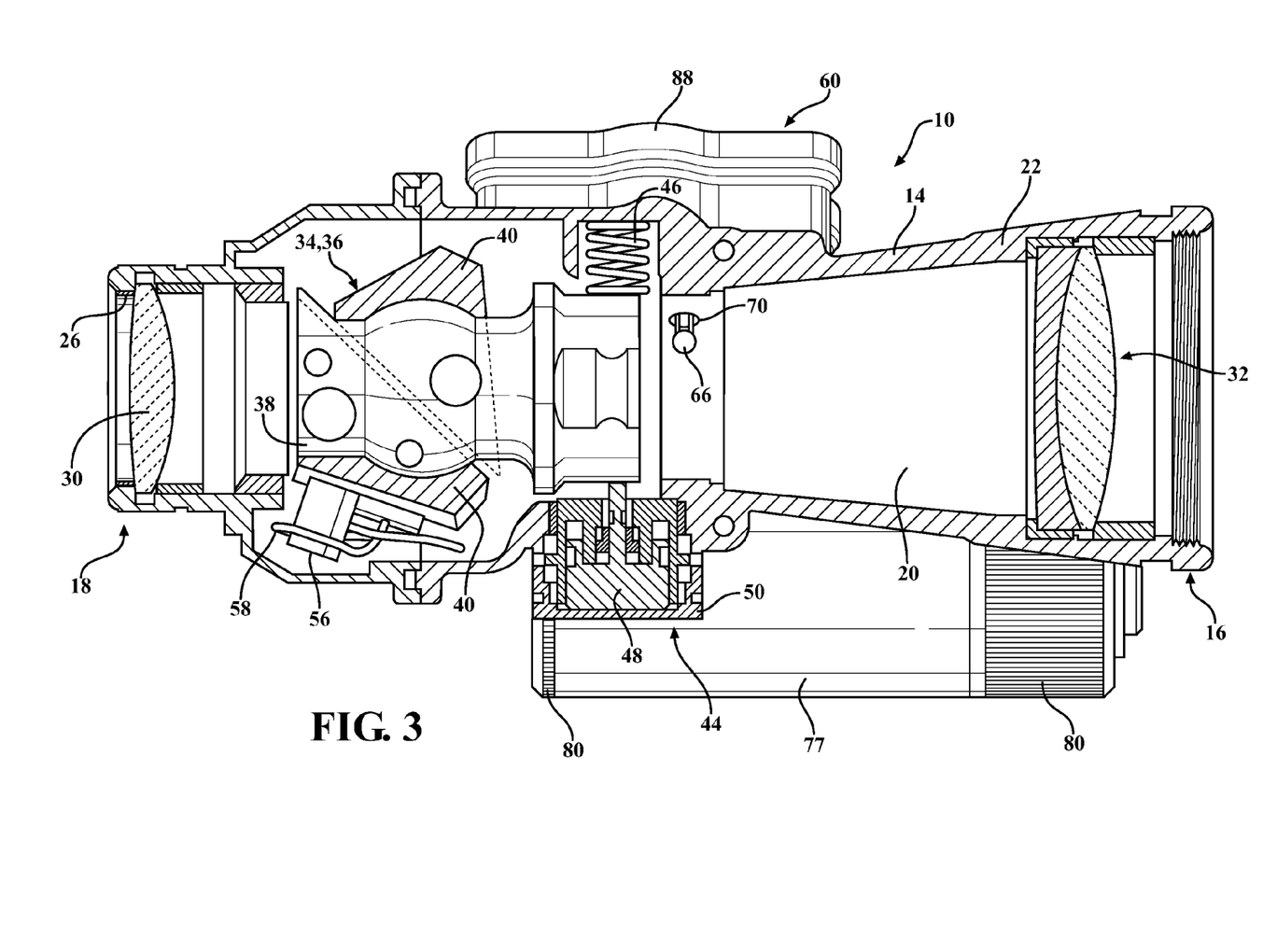
FIG. 3 is a cross-sectional view of the optical device along line 3 of FIG. 1.

With reference to FIGS. 1-3, the optical device 10 includes a tube 14 extending between an objective end 16 and an ocular end 18 and defining a viewing bore 20 extending from the objective end 16 to the ocular end 18. Specifically, the tube 14 includes a tube wall 22 defining the viewing bore 20, as shown in FIG. 3. The tube 14 is typically formed of a military grade alloy such as titanium or magnesium but can alternatively be formed of aluminum or any other suitable material.

The tube 14 is capable of supporting one or more accessories (not shown) such as, for example, lens caps, night vision optics, mini-sights, etc. For example, with reference to FIG. 1, the objective end 16 can define internal threads 24 for receiving accessories. Either or both of the objective end 16 and the ocular end 18 can define machined rings 26, e.g., 42 mm channels, for accepting accessories. Machined bosses 28 can also extend from the tube 14 for mounting accessories.

With reference to FIG. 3, an ocular lens 30 is disposed in the viewing bore and an objective lens 32 is spaced from the ocular lens 30 in the viewing bore 20. The objective lens 32 is mounted in the viewing bore 20 of the tube 14 adjacent the objective end 16 of the tube 14. The objective lens 32 is typically a doublet lens but can include any type of lens or combination of lenses without departing from the nature of the present invention. The objective lens 32 can be, for example, coated with a broadband anti-reflection coating.

The ocular lens 30 is mounted in the viewing bore 20 of the tube 14 adjacent the ocular end 18 of the tube 14. The ocular lens 30 is typically an assembly that includes a singlet lens (not numbered) and a doublet lens (not numbered) disposed adjacent the singlet lens between the singlet lens and the objective lens 32. However, it should be appreciated that the ocular lens 30 can include any type of lens or combination of lenses. The ocular lens 30 can be, for example, coated with a broadband anti-reflection coating. The tube 14 can be, for example, filled with dry nitrogen to reduce fogging of the objective lens 32 and the ocular lens 30.

With continued reference to FIG. 3, an optic 34 is disposed in the viewing bore 20 between the ocular lens 30 and the objective lens 32. The optic 34 is typically a prism assembly 36 that is disposed in the viewing bore 20 of the tube 14 between the objective lens 32 and the ocular lens 30. However, the optic 34 can be any type of optic without departing from the nature of the present invention.

Figure 4:
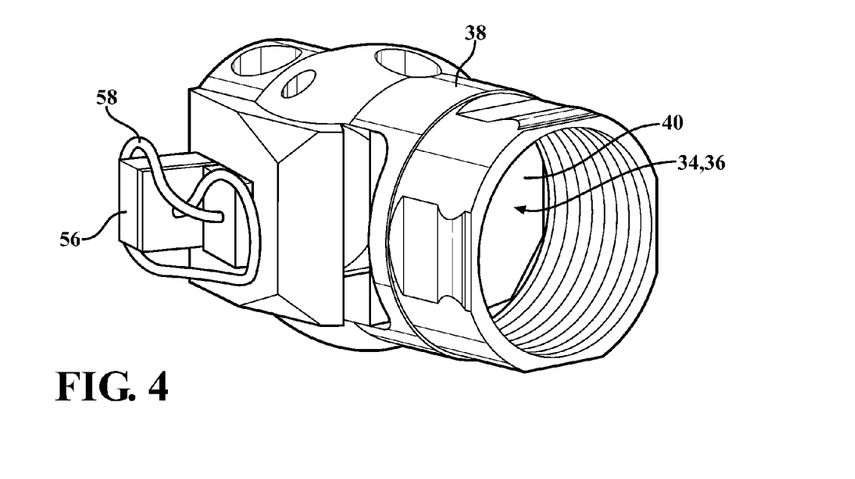
FIG. 4 is a perspective view of an optic.

With reference to FIGS. 3 and 4, the prism assembly 36 includes a prism housing 38 and a pair of prisms 40 mounted in the prism housing 38. Typically, the prism housing 38 is adjustably mounted in the tube 14, as set forth further below. The prism assembly 36 can be, for example, a Schmidt-Pechan prism but could alternatively be any type of prism assembly without departing from the nature of the present invention.

With reference to FIG. 1, the optical device 10 can include an elevation knob 42 and a windage knob 44 each coupled to the prism housing 38 for adjusting elevation and windage, respectively. As shown in FIG. 3, a spring assembly 46 is coupled to the prism housing 38 and opposes the windage knob 40 to urge the prism housing 38 toward the windage knob 40. Although not shown in the Figures, another spring assembly is coupled to the prism housing 38 and opposes the elevation knob 42 to urge the prism housing 38 toward the elevation knob 42.

Each of the elevation knob 38 and windage knob 40 include screws 48 that are typically threadedly engaged with the tube 14. The screws 48 of the elevation knob 38 and the windage knob 40 can be moved relative to the tube 14 toward or away from the prism housing 38 to adjust the position of the prism housing 38 in the tube 14. When moved relative to the tube 14 toward the prism housing 38, the screws 48 of the elevation knob 38 and the windage knob 40 move the prism housing 38 against the opposing spring assemblies 42 thereby compressing the opposing spring assemblies 42. When moved relative to the tube 14 away from the prism housing 38, the screws 48 of the elevation knob 42 and windage knob 44 relieve force on the prism housing 38 and the opposing spring assemblies 42 urge the prism housing 38 toward the elevation knob 42 and the windage knob 44. Caps 50 cover the screw 48 of each of the elevation knob 42 and the windage knob 44 and are typically threadedly engaged with the tube 14 for easy access of the screws 48. Wire cables (not numbered) can connect the caps 50 to the tube 14.

Figure 5:
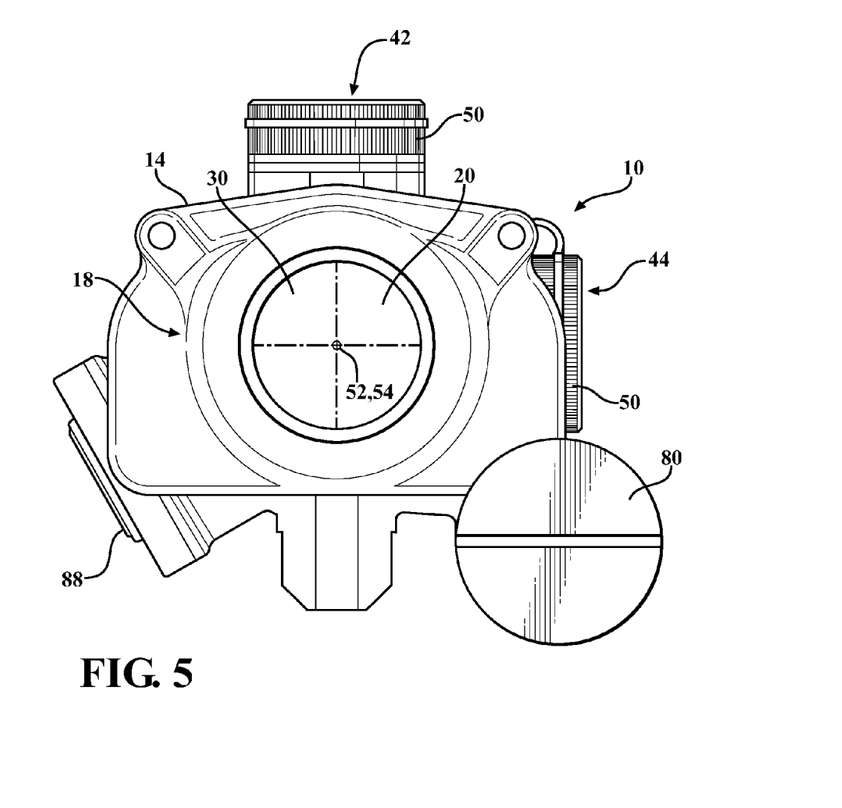
FIG. 5 is a front view of the optical device from an ocular end of the optical device.

With reference to FIG. 5, an aim point 52 is visible in the viewing bore when viewed through the ocular lens 30. The aim point 52 can be selectively illuminated, as set forth further below. The illuminated aim point 52 is typically a reticle 54 that is visible in the optical device 10 when viewed through the ocular lens 30 from the ocular end 18. It should be appreciated that the reticle 54 can have any pattern without departing from the nature of the present invention.

The optic 34 can define the aim point 52 that is illuminated, as set forth further below. For example, the reticle 54 can be defined on the optic 34 by lines etched on the optic 34, e.g., on at least one prism 40, or fibers embedded on the optic 34, e.g., on at least one prism 40. Alternatively, the illuminated aim point 52 can, for example, be defined by a laser. In any event, the aim point 52 is positioned on the optic 34 so that the aim point 52 is visible when the viewing bore 20 is viewed through the ocular lens 30. It should be appreciated that the aim point 52 can be defined in any way without departing from the nature of the present invention.

As set forth above, the aim point 52, e.g., the reticle 54, is selectively illuminated. For example, only a portion of the aim point 52 can be illuminated, e.g., only the center dot shown in FIG. 5. Alternatively, the entire aim point 52, e.g., the dot and the crosshairs shown in FIG. 5, can be illuminated. The aim point 52 can be illuminated in red, but alternatively, could be illuminated in any color or combination of colors.

With reference to FIGS. 3 and 4, a light source 56 is in communication with the viewing bore 20 for illuminating the aim point 52 that is visible in the viewing bore 20. In other words, for example, the light source 56 illuminates the reticle 54. The light source 56 is typically a light emitting diode (LED). Alternatively, the light source 56 can be any type of light source without departing from the nature of the present invention. As shown in FIGS. 3 and 4, the light source 56 can be supported on the prism housing 38. The light source 56 is typically compatible with night vision devices.

With reference to FIG. 4, the light source 56 can be in communication with the aim point 52 with a fiber optic tail 58 extending from the light source 56 to the aim point 52. Specifically, for example, the fiber optic tail 58 extends through the prism housing 38 to the reticle 54 to direct light to the reticle 54. It should be appreciated that the light source 56 can be in communication with the reticle 54 in any manner without departing from the nature of the present invention.

Figure 6:
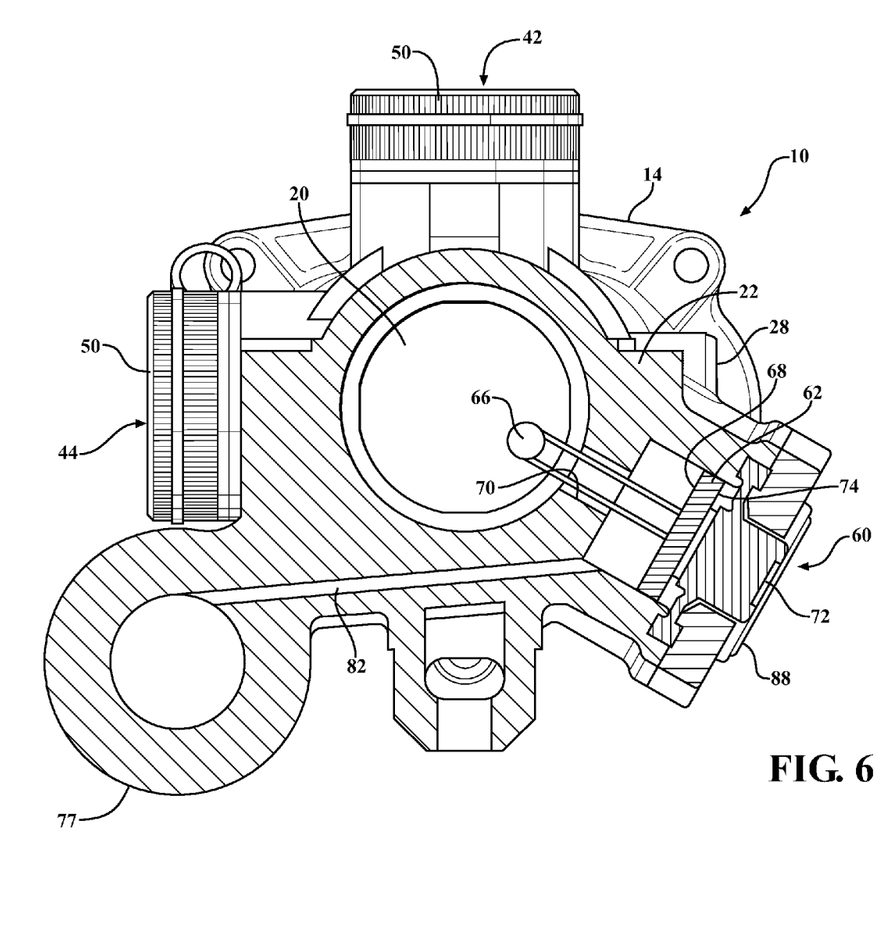
FIG. 6 is a cross-sectional view of the optical device along line 6 of FIG. 1.
Figure 7:
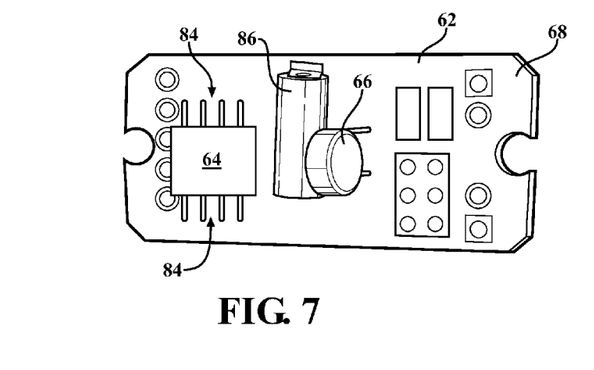
FIG. 7 is a perspective view of a first side of a circuit board of a control system.
Figure 8:
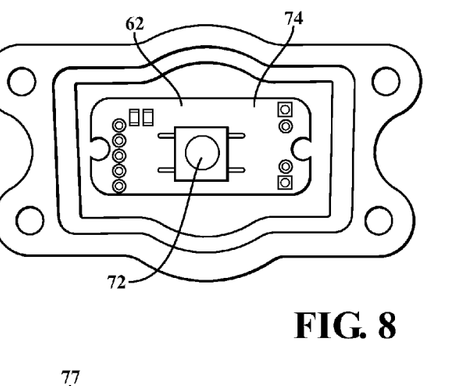
FIG. 8 is a front view of a second side of the circuit board.

With reference to FIGS. 6-8, the optical device 10 includes a control system 60 in communication with the light source 56 for controlling the brightness of the illuminated aim point 52. The control system 60 includes a circuit board 62 supported by the tube 14 exterior of the viewing bore 20. The control system 60 typically includes a microcontroller 64 mounted to the circuit board 62. Alternatively or in addition to the microcontroller 64, the control system 60 can include any type of computer or integrated circuit.

Figure 11:
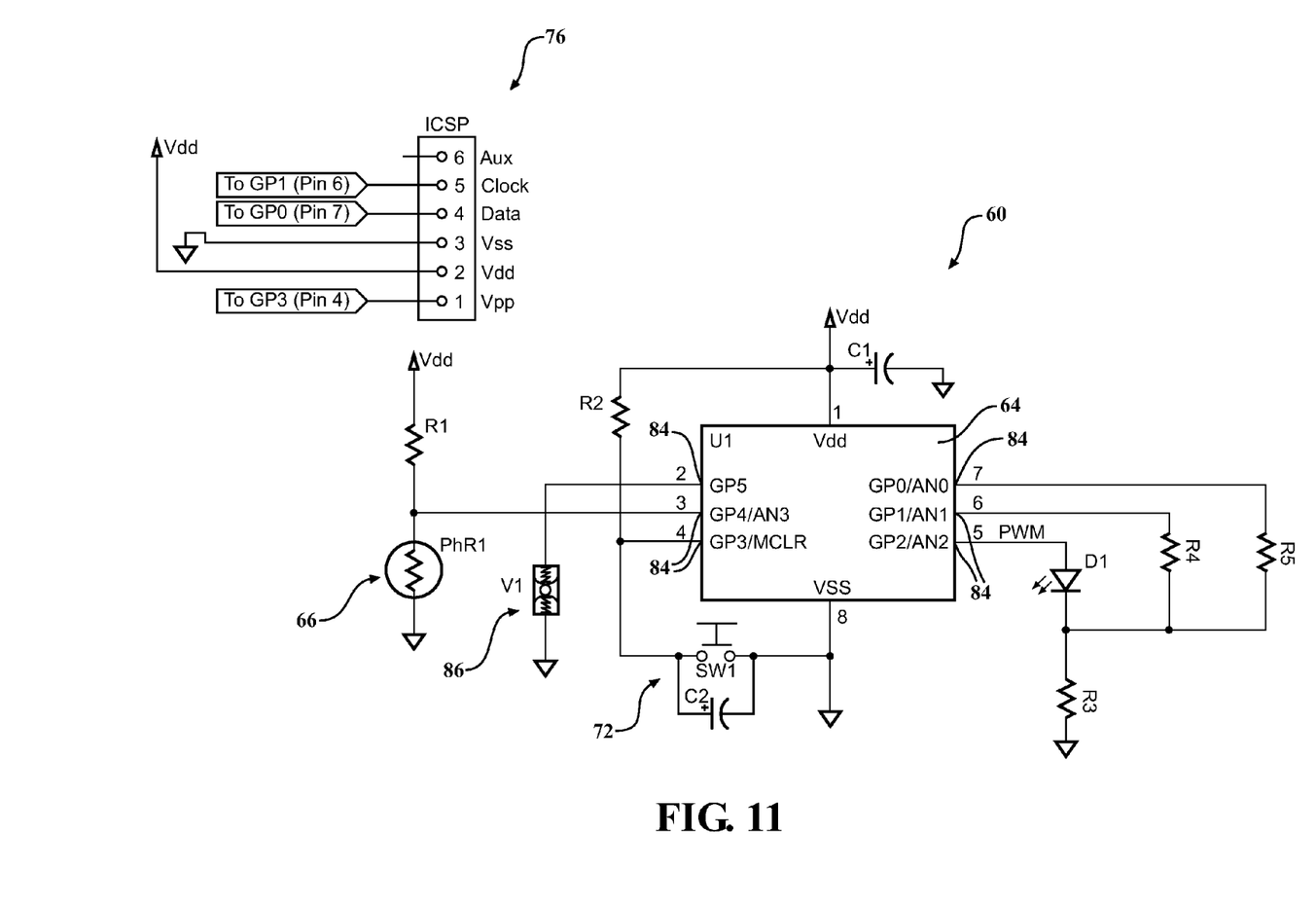
FIG. 11 is a schematic of the control system.

With reference to FIGS. 7 and 11, the microcontroller 64 is mounted to the circuit board 62. As set forth further below, the microcontroller 64 can be configured to be initially programmed with a standard operating program for automatically and/or manually adjusting the brightness of the illuminated aim point 52. The programmable microcontroller 64 can be configured to be subsequently reprogrammed, for example in the field, with an alternative program, as set forth further below.

The microcontroller 64 is typically configured to be programmed by in circuit serial programming (ICSP), i.e., without removing the microcontroller 60 from the control system 60, as set forth further below. For example, the microcontroller 64 is configured to self-program upon connection to a mass storage device 90 such as a USB flash drive 92. The microcontroller can be, for example, the type commercially available under the tradename PIC12F683 by Microchip® of Chandler, Ariz. However, it should be appreciated that the microcontroller can be any type of microcontroller without departing from the nature of the present invention.

With reference to FIGS. 6 and 7, the control system 60 includes a light sensor 66 mounted to the circuit board 62. The light sensor 66 is, for example, a photocell such as a cadmium-sulfide photcell, but alternatively can be any type of photocell without departing from the nature of the present invention. It should be appreciated that the light sensor 66 can be any type of light sensor without departing from the nature of the present invention.

With reference to FIGS. 6 and 7, the light sensor 66 is supported on the circuit board 62. The light sensor 66 extends from the circuit board 62 through the tube wall 22 into the viewing bore 20 for sensing light in the viewing bore 20. Specifically, with reference to FIG. 6, the circuit board 62 includes a first side 68 facing the tube 14 and the light sensor 66 is mounted to the first side 68 and extends from the first side 68 through the tube wall 22 into the viewing bore 20. The tube 14 typically defines a cutout 70, as shown in FIGS. 3 and 6, extending through the tube wall 22 to the viewing bore 20 and the light sensor 66 extends through the cutout 70 into the viewing bore 20.

With continued reference to FIG. 3, the cutout 70 is disposed between the ocular lens 30 and the objective lens 32 such that the light sensor 66 extends from the circuit board 62 through the tube wall 22 into the viewing bore 20 between the ocular lens 30 and the objective lens 32 for sensing light in the viewing bore 20. More specifically, the light sensor 66 extends into the viewing bore 20 between the objective lens 32 and the prism assembly 36. The circuit board 62 is positioned along the tube 14 between the ocular lens 30 and the objective lens 32, and specifically, between the objective lens 32 and the prism assembly 36, to minimize the distance that the light sensor 66 extends between the circuit board 62 and the viewing bore 20.

As set forth further below, the light sensor 66 measures the light level at the target area so that the brightness of the illuminated aim point 52 can be adjusted accordingly. Since the light sensor 66 is positioned between the objective lens 32 and the prism assembly 36, the light sensor 66 measures the light entering the optical device 10, i.e., measures the light of the target area as opposed to the light in the area surrounding the optical device 10. In additional, since the light sensor 66 is located behind the objective lens 32 relative to the target area, the objective lens 32 magnifies the light from the target area to the light sensor 66.

Since the light sensor 66 measures the light of the target area, the brightness of the illuminated aim point 52 can be adjusted based on the light level of the target area. In other words, the brightness of the illuminated aim point 52 is adjusted based on the brightness of the target area regardless of the light levels surrounding the optical device 10. For example, in a scenario where the target area is bright and the area surrounding the optical device 10 is dark, the control system automatically adjusts the brightness of the illuminated aim point 52 based on the brightness of the target area as opposed to the darkness of the area surrounding the optical device 10.

With reference to FIG. 8, a switch 72 is supported on the circuit board 62 for manually varying the brightness of the illuminated aim point 52. The switch 72 is typically a push button (not numbered) that is normally open and is depressed to control the control system 60. However, the switch 72 can be any type of switch without departing from the nature of the present invention.

With reference to FIGS. 6 and 8, the circuit board 62 includes a second side 74 opposite the first side 68 with the switch 72 mounted to the second side 74. The circuit board 62 is mounted relative to the tube 14 such that the first side 68, and hence switch 72, faces outwardly to expose the switch 72 so that a user can depress the switch 72. As best shown in FIG. 2, a cover 88, typically made of rubber, for example, covers the circuit board 62 and the switch 72 and is moveable to allow for the switch 72 to be depressed. The cover 88 protects the circuit board 62 from moisture and other elements during use.

The design of the control system 60 set forth above provides a compact configuration that advantageously reduces the size of the optical device 10. Specifically, the light sensor 66 and the switch 72 are each mounted to the same circuit board 62, which also advantageously reduces components thereby reducing cost. Further, since the light sensor 66 and the switch 72 are mounted on the first and second sides 68, 74, respectively, the circuit board 62 is positioned so that the first side 68 faces the tube 14 and the second side 74 faces away from the tube 14, as set forth above. As such, the circuit board 62 is conveniently positioned between the ocular lens 30 and the objective lens 32, and more specifically between the objective lens 32 and the prism assembly 36. As set forth above, such a construction minimizes the distance that the light sensor 66 extends between the circuit board 62 and the viewing bore 20. Further, since the switch 72 is mounted to the second side 74, the switch 72 faces away from the tube 14 and is exposed for easy access. The positioning of the circuit board 62 between the between the ocular lens 30 and the objective lens 32, and specifically, between the objective lens 32 and the prism assembly 36, results in a conveniently accessible location of the switch 72 along the tube 14.

Figure 9:
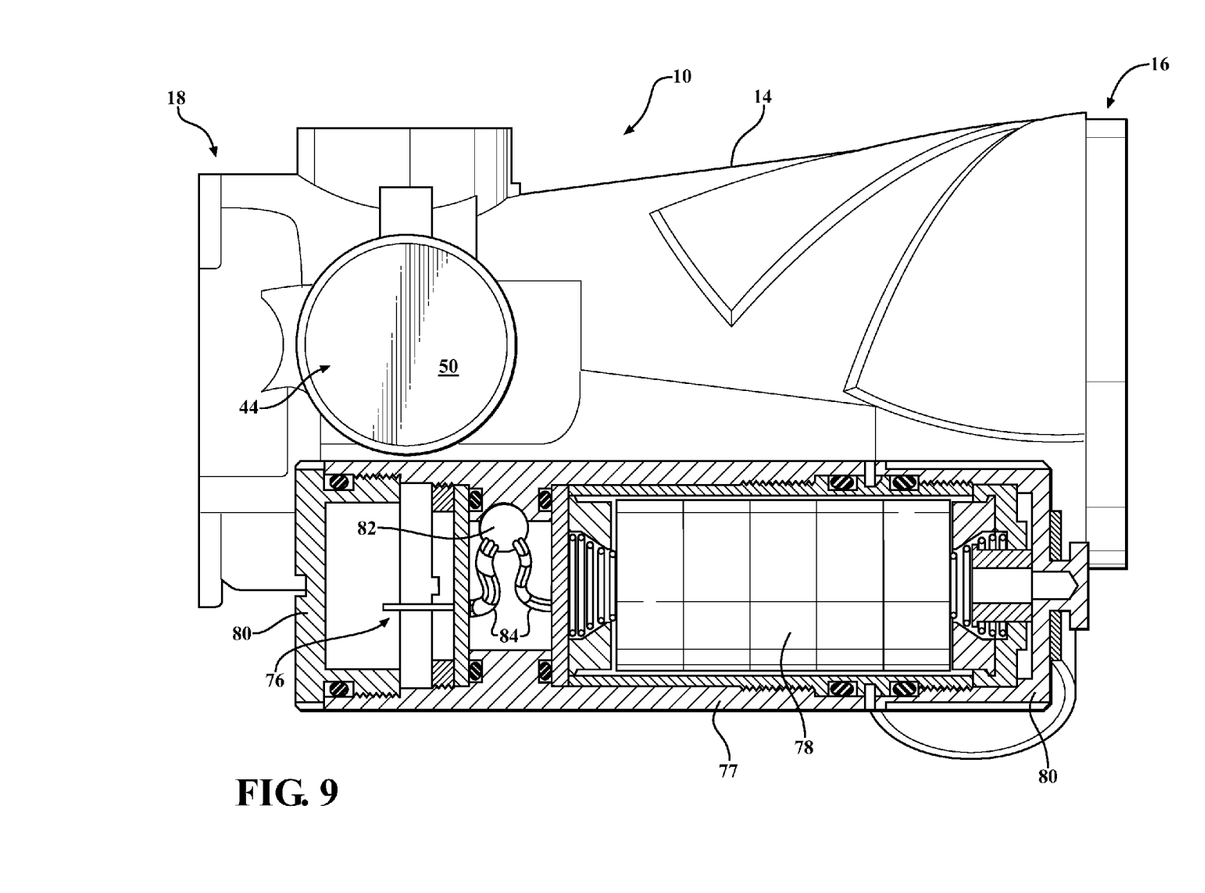
FIG. 9 is a cross-sectional review of the optical device along line 9 of FIG. 1.
Figure 10A:
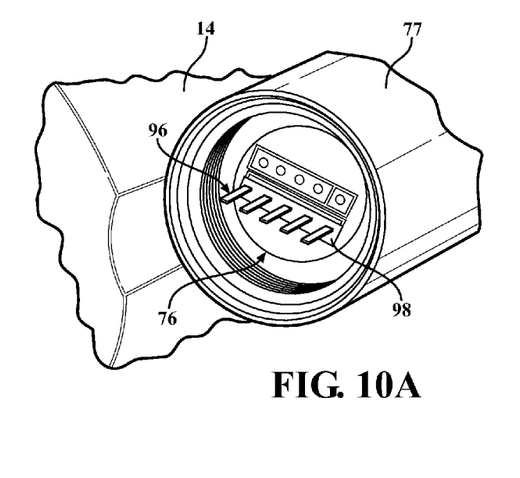
FIG. 10A is a partial view of the optical device including an interface.
Figure 10B:
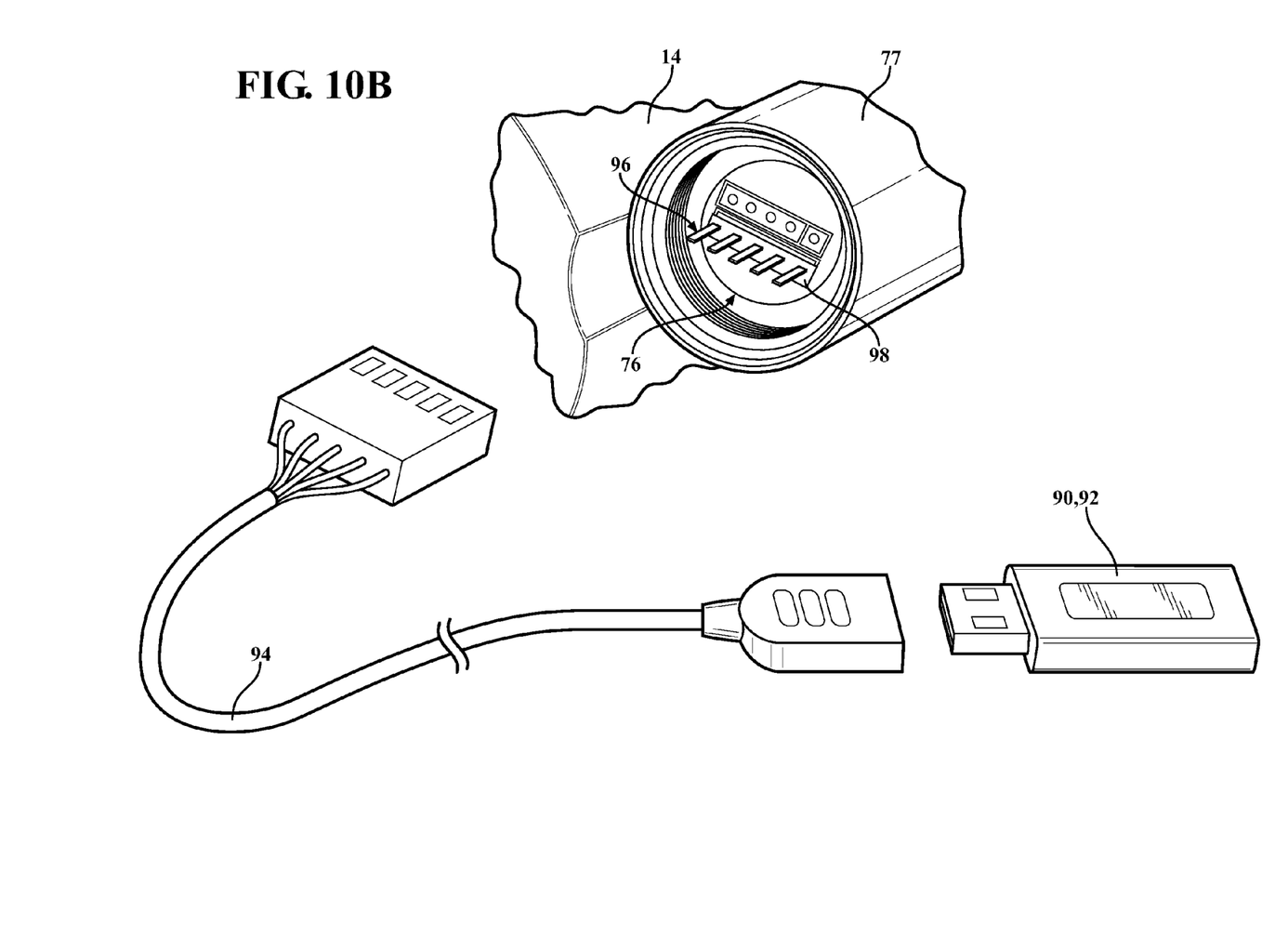
FIG. 10B is a partial view of the optical device of FIG. 10A including an adapter and a mass storage device for connection to the interface.

With reference to FIGS. 9-10B, the optical device 10 includes an interface 76 supported by the tube 14 and spaced from the circuit board 62. The interface 76 is in communication with the control system 60. For example, the interface 76 is in communication with the microcontroller 64. As set forth above, the microcontroller 64 is configured to be ICSP. As such, for example, the microcontroller 64 can be reprogrammed through the interface 76, as set forth further below. As also set forth below, in the addition or the alternative, the interface 76 and the microcontroller 64 are configured to power the control system 60 through the interface 76 when the interface 76 is connected to a power supply.

In addition or the alternative, the interface 76 and the microcontroller 64 are configured to communicate with a remote control (not shown) connected to the interface 76. In other words, the remote control is connected to the interface 76 to control the control system 60 through the interface 76. For example, the remote control can include a switch, such as a push button that communicates with the microcontroller 64 through pin 1 of the interface 76 and pin 4 (GP3/MCLR) of the microcontroller 64, as shown in FIG. 11, to control the control system 60 in the alternative to or in addition to the switch 72.

The interface 76 typically includes pins 96 in communication with the microcontroller 64. Typically, the interface 76 is a five-pin header 98 presenting five pins 96 as shown in FIGS. 10A-B. Alternatively, a sixth pin 98 is shown in FIG. 11 merely for exemplary purposes. However, the interface 76 can include any number of pins 98 without departing from the nature of the present invention. It should be appreciated that the interface 76 can be any type of interface without departing from the nature of the present invention.

With reference to FIG. 9, the optical device 10 includes a canister 77 spaced from the circuit board 62 that supports and houses the interface 76. The canister 77 can define a battery compartment 78 for supporting a battery (not shown). The battery can be, for example, a lithium 123 3-volt battery, but alternatively or in addition could be any type of battery without departing from the nature of the present invention. One alternative could be, for example, one or more standard AA 1.5-volt battery. As one example, the canister 77 can support both a lithium 123 3-volt battery and a standard AA 1.5-volt battery such that the control system 60 can be powered by either type of battery depending upon availability and life of the two types of batteries. FIG. 9 illustrates that the battery compartment 78 has suitable hardware (not numbered) for electrically connecting to one or more batteries and to wires 84. It should be appreciated that the hardware in the battery compartment 78 can be of any type without departing from the nature of the present invention.

The canister 77 can include caps 80 for selectively covering the interface 76 and the battery. Typically, the caps 80 are threadedly engaged with the canister 77. It should be appreciated that in the alternative to the canister 77, the interface 76 and the battery can be supported in other areas of the tube 14 without departing from the nature of the present invention.

With reference to FIGS. 6 and 9, the tube 14 defines a passage 82 extending from the canister 77 to the circuit board 62. Specifically, the passage 82 typically extends through the tube wall 22 from the interface 76 to the control system 60. The passage 82 allows for communication between the spaced apart control system 60 and interface 76. For example, as shown in FIG. 9, wires 84 extend through the passage 82 from the interface 76 to the control system 60 for providing communication between the interface 76 and the control system 60. Also, wires 84 extend from the battery compartment 78 to the control system 60 for powering the control system 60. Specifically, the wires 84 extend between the interface 76 and the microcontroller 64 and between the battery and the microcontroller 64. It should be appreciated that the wires 84 are not shown in the cross-sectional view of FIG. 6.

Since the control system 60 and the interface 76 are advantageously spaced from each other, the overall size and weight balance of the optical device 10 is optimized. In other words, the size and the weight are evenly distributed on opposing sides of the optical device 10. Further, the switch 72 of the control system 60 and the interface 76 can be conveniently accessed simultaneously.

The interface 76 can be in communication with the battery compartment 78, and more specifically, in electrical communication with the battery, for charging the battery and/or for drawing power from the battery. In other words, to charge the battery, the interface 76 is connected to a source of electricity. To draw power from the battery, a device (not shown) that draws power is connected to the interface 76. A suitable adapter, for example, can be connected to the interface 76 and the source of electricity/device that draws power to supply power to and/or draw power from the battery through the interface 76.

Typically, the microcontroller 64 is configured to manage the flow of power between the interface 76 and the battery compartment 78. Specifically, the microcontroller 64 is configured to direct power from the interface 76 to the battery compartment 78 for charging the battery and the microcontroller 64 is configured to direct power from the battery compartment 78 to the interface 76 to power a device connected to the interface 76.

As shown in FIGS. 7 and 11, a vibration motion sensor 86 can be mounted to the circuit board 62 to put the microcontroller 64 in "sleep" mode if vibration or motion is not detected for a certain amount of time, e.g., two hours. The vibration motion sensor 86 prolongs the life of the battery by reducing energy consumption.

As set forth above, the microcontroller 64 is typically originally programmed with a standard operating program. The standard operating program includes an automatic mode and a manual mode, as set forth further below. In use, the optical device 10 is activated by pressing the switch 72 through the cover 88 a single time. Once activated, the control system 60 can be deactivated at any time during the automatic mode or the manual mode by pressing the switch 72 for a predetermined time, for example, three seconds.

When originally activated, the control system 60 is in an automatic mode and will measure the brightness of the target area and automatically adjust the brightness of the illuminated aim point 52. The light sensor 66 continuously measures the brightness of the target area such that the brightness of the aim point 52 is continuously adjusted as the light level of the target area changes.

The control system 60 can be switched from an automatic mode to a manual mode by pressing the switch 72 a second time. The control system 60 can be programmed to have between 2 and 30 different brightness settings in the manual mode. When initially switched to manual mode, the illuminated reticle 54 is at an initial manual setting, for example, the brightest setting. Once in manual mode, the switch 72 is repeatedly pressed to scroll through each setting, i.e., each time the switch 72 is pressed the brightness of the illuminated aim point 52 is changed to the next setting. Each setting can, for example, have decreased brightness over the prior setting. When the last setting has been reached, for example, the dimmest night vision setting, an additional press of the switch 72 reverts the brightness of the illuminated aim point 52 to the initial manual setting so that the brightness settings can be scrolled through another time by the same steps. The standard operating program can, for example, include ten day settings of varying brightness and three night vision settings of varying brightness.

As set forth above, the control system 60 can be reprogrammed based on user preference. For example, the brightness of the illuminated aim point 52 in the automatic mode can be shifted if the user feels that the illuminated aim point 52 is always too dim or too bright in the automatic mode. As another example, the manual mode can be changed during reprogramming to change the number and/or order of manual brightness settings and to adjust the brightness of the brightest and dimmest settings and each setting in between.

The microcontroller 60 is configured to be reprogrammed through the interface 76. In other words, the microcontroller 60 is configured to be programmed by ICSP, i.e., through the interface 76 without removing the microcontroller 60 from the control system 60. For example, the microcontroller 64 can be reprogrammed through the interface 76 with the use of a cable or a light source.

For example, the interface 76 can be configured to be connected to a mass storage device 90 for programming the microcontroller 60. As one example, the interface 76 is a universal serial bus (USB) interface for connecting to a USB flash drive 92 and the microcontroller 60 is configured to be automatically reprogrammed through connection of the USB flash drive 92 to the interface 76. In other words, the control system 60 can be reprogrammed by connecting the interface 76 to the mass storage device 90, e.g., the USB flash drive 92, to automatically load the program from the mass storage device 90 to the control system 60. It should be appreciated that the mass storage device 90 can be any type of mass storage device without departing from then nature of the present invention.

With reference to FIG. 10B, the interface 76 can, for example, include an adapter 94 for connection to the mass storage device 90, e.g., the USB flash drive 92. Alternatively, the interface 76 can be configured for direct connection with the mass storage device 90.

In addition, or alternatively, the control system 60 can be reprogrammed, for example, by connecting the interface 76 to a computer (not shown). When connected to the computer, the control system 60 can be reprogrammed with the use of, for example, a computer program located on the computer or located on the internet. It should be appreciated that the control system 60 can be reprogrammed in any way without departing from the nature of the present invention.

The control system 60 and the interface 76 are shown schematically in FIG. 11. Pulse width modulation (PWM) is used to control the average voltage across the light source 56, e.g., the LED. In FIG. 11, that function is delivered with a pin 5 (GP2/AN2) of the microcontroller 64, the light source 56, and resistor R3 for current limiting. Resistor R4 and resistor R5 each have less resistance than resistor R3 and are connected to one side of resistor R3 and the light source 56. When the opposite side of the resistors R4, R5 are connected to ground, they electrically are placed in parallel with the resistor R3 thus reducing the overall resistance and in turn increase the current through the light source 56. By using the microcontroller 64 software and separate I/O ports 99 to control when the resistors R4, R5 are connected to ground, the proper current range can be set for the PWM signal level being used and results in a much larger range of brightening or dimming of the light source 56. For example, resistance values of resistor R3, resistor R4, and resistor R5 can be 10MΩ, 1 kΩ and 10 kΩ, respectively; however, these resistance values are provided for exemplary purposes and the values can be different without departing from the nature of the present invention.

In the optical device 10, this control system 60 shown schematically in FIG. 11 is used to create a much larger range of dimming than a single resistor PWM circuit would allow. As such the range of dimming is increased by a factor of three and could be larger if more resistors and microcontroller I/O pins 99 were used.

The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

What is claimed is:

1. An optical device comprising:
a tube including a tube wall defining a viewing bore;
a light source in communication with said viewing bore for illuminating an aim point visible in said viewing bore;
a control system including a circuit board supported by said tube exterior of said viewing bore, said control system being in communication with said light source for controlling brightness of the illuminated aim point; and
said control system including a light sensor mounted to said circuit board and extending from said circuit board through said tube wall into said viewing bore for sensing light in said viewing bore;
wherein said tube wall defines a cutout extending through said tube wall to said viewing bore and said light sensor extends through said cutout into said viewing bore.

2. The optical device according to claim 1 further comprising an ocular lens disposed in said viewing bore and an objective lens spaced from said ocular lens in said viewing bore with said cutout disposed between said ocular lens and said objective lens.

3. The optical device according to claim 1 further comprising an interface supported by said tube and spaced from said circuit board, said interface being in communication with said control system.

4. The optical device according to claim 3 wherein said control system includes a microcontroller mounted on said circuit board and in communication with said interface.

5. An optical device comprising:
a tube including a tube wall defining a viewing bore;
a light source in communication with said viewing bore for illuminating an aim point visible in said viewing bore;
a control system including a circuit board supported by said tube exterior of said viewing bore, said control system being in communication with said light source for controlling brightness of the illuminated aim point;
said control system including a light sensor mounted to said circuit board and extending from said circuit board through said tube wall into said viewing bore for sensing light in said viewing bore; and
an interface supported by said tube and spaced from said circuit board, said interface being in communication with said control system;
wherein said control system includes a microcontroller mounted on said circuit board and in communication with said interface;
wherein said interface includes pins in communication with said microcontroller.

6. The optical device according to claim 5 wherein said microcontroller is configured to be reprogrammed through said interface.

7. The optical device according to claim 5 wherein said interface is configured to be connected to a mass storage device and wherein said microcontroller is configured to be automatically reprogrammed through connection of the mass storage device to said interface.

8. The optical device according to claim 5 wherein said tube defines a passage through said tube wall from said interface to said control system with wires extending through said passage from said interface to said control system for providing communication between said interface and said control system.

9. The optical device according to claim 5 further including a canister spaced from said circuit board and housing said interface.

10. The optical device according to claim 9 wherein said canister includes a battery compartment.

11. The optical device according to claim 10 wherein said tube defines a passage through said tube wall from said canister to said control system with wires extending through said passage from said interface to said control system for providing communication between said interface and said control system and with wires extending from said battery compartment to said control system for powering said control system.

12. An optical device comprising:
a tube including a tube wall defining a viewing bore;
a light source in communication with said viewing bore for illuminating an aim point visible in said viewing bore;
a control system including a circuit board supported by said tube exterior of said viewing bore, said control system being in communication with said light source for controlling brightness of the illuminated aim point; and said control system including a light sensor mounted to said circuit board and extending from said circuit board through said tube wall into said viewing bore for sensing light in said viewing bore;

wherein said control system includes a switch supported on said circuit board for manually varying the brightness of the illuminated aim point.

13. The optical device according to claim 12 wherein said circuit board includes a first side facing said tube and a second side opposite said first side with said light sensor mounted to said first side and with said switch mounted to said second side.

14. An optical device comprising:
a tube including a tube wall defining a viewing bore;
a light source in communication with said viewing bore for illuminating an aim point visible in said viewing bore;
a control system including a circuit board supported by said tube exterior of said viewing bore, said control system being in communication with said light source for controlling brightness of the illuminated aim point;
said control system including a light sensor mounted to said circuit board and extending from said circuit board through said tube wall into said viewing bore for sensing light in said viewing bore; and
an ocular lens disposed in said viewing bore, an objective lens spaced from said ocular lens in said viewing bore, and an optic disposed in said viewing bore between said ocular lens and said objective lens, said optic defines said aim point that is illuminated by said light source.

15. An optical device comprising:
a tube including a tube wall defining a viewing bore;
an ocular lens and an objective lens spaced from each other in said viewing bore;
a light source in communication with said viewing bore for illuminating an aim point visible in said viewing bore;
an optic disposed in said viewing bore between said ocular lens and said objective lens and defining said aim point that is illuminated by said light source;
a control system including a circuit board supported by said tube exterior of said viewing bore, said control system being in communication with said light source for controlling brightness of the illuminated aim point; and
said control system including a light sensor mounted to said circuit board and extending from said circuit board through said tube wall into said viewing bore between said ocular lens and said objective lens for sensing light in said viewing bore.

16. The optical device according to claim 15 further comprising an interface supported by said tube and spaced from said circuit board, said interface being in communication with said control system.

17. The optical device according to claim 16 wherein said control system includes a microcontroller mounted on said circuit board and in communication with said interface and configured to be reprogrammed through said interface.

18. The optical device according to claim 16 further including a canister spaced from said circuit board and housing said interface.

19. The optical device according to claim 18 wherein said canister includes a battery compartment.

20. The optical device according to claim 19 wherein said tube defines a passage through said tube wall from said canister to said control system with wires extending through said passage from said interface to said control system for providing communication between said interface and said control system and with wires extending from said battery compartment to said control system for powering said control system.

21. The optical device according to claim 15 wherein said circuit board includes a first side facing said tube and a second side opposite said first side, said light sensor being mounted to said first side and said control system including a switch mounted to said second side for manually varying the brightness of the illuminated aim point.

\* \* \* \* \*